Patented Oct. 31, 1933

1,933,124

UNITED STATES PATENT OFFICE 1,933,124

PREPARATION OF ESTER-ALDEHYDE CONDENSATION PRODUCTS

Fritz Seebach, Erkner, near Berlin, Germany, assignor to Bakelite Gesellschaft mit beschrankter Haftung, Berlin, Germany No Drawing. Application November 20, 1930, Serial No. 497,068, and in Germany December 10, 1929

11 Claims. (Cl. 260—3)

In preparing phenol-aldehyde condensation products, the well known usual start is made with phenol or cresol, but other phenols, such as resorcin, dioxydiphenyl-dimethylene-methane, naphthol, oxydiphenyl, etc. can be used. In most cases phenol or cresol is used in these synthetic resin compositions, since phenol and cresol are available to the industry in large quantities and at comparatively low prices. The other phenols named above rank in commercial importance far below phenol and cresol. In preparing condensation products from the latter phenols, the typical procedure is to use the phenols directly and in general to heat the phenols, for example with formaldehyde and a catalyst, until the resin is formed.

It has now been found that products of the type of the phenol-aldehyde condensation products may be obtained even if free phenols are not used as the starting materials, but if an ester-like compound containing aryl groups is used, such a substance is, for example, phenyl-carbonate, from which by a very simple reaction with a material containing methylene groups, a synthetic resin behaving in its characteristics like a phenol-aldehyde condensation product, has been obtained. According to the following example a synthetic resin is obtained from phenyl-carbonate (a crystallized substance with a melting point of 78° C.) and hexamethylenetetramine, by simply heating or fusing the substances, which resin in its characteristics is equivalent to the phenol-aldehyde condensation product obtained directly from phenol ($C_6H_5OH$) and formaldehyde. According to the ratio of the quantities of hexamethylenetetramine and phenyl-carbonate which are reacted various resins are obtained with either novolak or resole characteristics. Any kind of resoles may be thus obtained, from the slowly hardening resoles to those hardening rapidly. Formaldehyde and its polymers as well as other aldehydes may be used.

The condensation reaction itself, that is, the action of hexamethylenetetramine upon phenyl-carbonate, need not be completely carried out in the condensation apparatus. The two substances need only be melted together. The fusion product may be pulverized when cold and mixed with a filler. From this mixture molded products may be made by the application of heat and pressure or even by cold molding.

In general, the reaction between phenyl-carbonate and hexamethylenetetramine runs very smoothly. By applying too much heat, it may become very violent and under certain conditions may yield a fully hardened material within a few moments. As much as this rapid and vigorous hardening is desirable in certain technical operations, as for example in hot molding, equally great importance must naturally also be placed on obtaining a smooth and quiet reaction in the condensing apparatus. This is achieved by a careful calculation of the aldehyde needed and also by adding the hardening agent and the phenyl-carbonate to the condensing apparatus in proper quantities in the form of a previously prepared fused mixture. The hexamethylenetetramine and the phenyl-carbonate may thus be added to the condenser already mixed or melted. During the condensation some ammonia develops; water does not form. A considerable part of the ammonia together with the acid radical of the ester present react quantitatively to form the acid-amide, which is further modified in the subsequent condensation. Hexamethylenetetramine in mixture with paraformaldehyde may also be used if the quantity of the former is calculated carefully, so that there is sufficient nitrogen from the hexamethylenetetramine to form the acid amides. The addition of a small amount of water, which may be mixed with the reacting substances, favors the amide formation.

Example 1.—70 kilos hexamethylenetetramine and 320 kilos phenyl-carbonate are melted down in a condensating apparatus having an agitator. The temperature is not allowed to rise above 150° C. and the reaction takes about 10 minutes. Higher temperatures, for example 200–220° C. increases the speed of reaction to such an extent that the entire reaction is carried out in just a few minutes. In this case the apparatus must be provided with a very wide exhaust opening, so that the ammonia given off may escape freely. In working at lower temperatures, the conversion requires more time but is less violent. The product thus made is a solid substance similar to novolak.

Example 2.—140 kilos hexamethylenetetramine and 410 kilos phenyl carbonate are melted together at 120–130° C. It is not advisable to carry out the reaction in the condensation apparatus at higher temperatures than this because it will become too violent. The molten mixture after cooling, may be ground, mixed with fillers, in its pulverized condition and kneaded. At higher temperatures as in hot pressing, the resole obtained is very rapidly transformed into the "C" state.

Example 3.—The quantities of hexamethylenetetramine and phenyl-carbonate stated in Example 2 are reacted with 300 kilos glacial acetic acid. The reaction begins at 130° C. The excess of acetic acid may be distilled off in vacuo or may be removed by a higher boiling solvent. The resin formed is a resole. Instead of acetic acid, cyclohexanol may be used.

*Example 4.*—80 kilos phenyl-carbonate, 28 kilos hexamethylenetetramine, 24 kilos glacial acetic acid and 80 kilos wood alcohol are kept at 150° C. for 15 minutes in a pressure apparatus. An alcoholic resole solution is obtained, which may be used directly as varnish.

Instead of phenyl-carbonate, cresyl carbonate, naphthyl carbonate and homologous compounds or mixtures of the carbonates are available. Furthermore, analogous compounds of other organic acids may be used instead of the carbonates, and in general the ester-like compounds may be reacted in mixture with any desired quantity of free phenol. The same condensation reaction, as with phenyl-carbonate or its equivalent, may be carried out with phenyl salicyclic ester or orthoformic phenyl ester. Mixed esters, i. e. aliphatic-aromatic esters may also be treated by this process. In preparing and manufacturing condensation products all the additions usual for the known phenol-aldehyde condensation products may be used, as for example catalyzers, such as ammonium chloride, fillers, dyes, plasticizers and the like.

I claim:

1. Process of preparing resinous condensation products which comprises condensing an aromatic ester of an aliphatic acid with a reactive methylene-containing agent.

2. Process according to claim 1 in which the condensation is carried out in the presence of a catalyst.

3. Process according to claim 1 in which the aromatic ester is phenyl carbonate.

4. Process according to claim 1 in which the ester is a mixed aromatic ester of an aliphatic acid.

5. Process according to claim 1 in which the agent is hexamethylenetetramine.

6. Process according to claim 1 in which the agent is a mixture of hexamethylenetetramine and paraformaldehyde.

7. Process according to claim 1 in which the agent is a mixture of hexamethylenetetramine and paraformaldehyde, so proportioned to afford sufficient nitrogen content to form an acid amide with the acid radical contained in the ester.

8. Condensation product of an aromatic ester of an aliphatic acid with a reactive methylene-containing agent.

9. Condensation product of a phenyl ester of an aliphatic acid with a reactive methylene-containing agent.

10. Condensation product of phenyl carbonate with a reactive methylene-containing agent.

11. Condensation product of phenyl carbonate and hexamethylenetetramine.

FRITZ SEEBACH.